United States Patent [19]
Johansson et al.

[11] Patent Number: 5,254,142
[45] Date of Patent: Oct. 19, 1993

[54] WHISKER REINFORCED COMPOSITES FOR CUTTING TOOLS WITH IMPROVED PERFORMANCE

[75] Inventors: Per G. Johansson, Bromma; N. Gunnar L. Brandt, Solna, both of Sweden

[73] Assignee: Sandvik AB, Sandviken, Sweden

[21] Appl. No.: 822,851

[22] Filed: Jan. 21, 1992

[30] Foreign Application Priority Data

Jan. 21, 1991 [SE] Sweden ................. 9100176

[51] Int. Cl.$^5$ ............................................. C04B 35/56
[52] U.S. Cl. ......................................... 51/309; 501/89; 501/95; 501/127
[58] Field of Search .................. 501/89, 95, 127, 128; 51/309

[56] References Cited

U.S. PATENT DOCUMENTS

| | | |
|---|---|---|
| 4,218,253 | 8/1980 | Dworak et al. . |
| 4,543,345 | 9/1985 | Wei . |
| 4,657,877 | 4/1987 | Becher et al. . |
| 4,756,895 | 6/1988 | Boecker et al. . |
| 4,774,209 | 9/1988 | Gadkaree et al. ............... 501/89 |
| 4,789,277 | 12/1988 | Rhodes et al. ............... 501/153 X |
| 4,889,835 | 12/1989 | Niihara et al. ............... 501/89 |
| 4,916,092 | 4/1990 | Tiegs et al. . |
| 4,961,757 | 10/1990 | Rhodes et al. ............... 501/89 X |
| 4,965,231 | 10/1990 | Mehrotra et al. ............... 501/89 |
| 4,981,665 | 1/1991 | Boecker et al. . |
| 4,994,416 | 2/1991 | Tiegs et al. ............... 501/89 X |
| 5,002,905 | 3/1991 | Boecker et al. . |
| 5,006,290 | 4/1991 | Hida ............... 501/89 X |
| 5,011,799 | 4/1991 | Das Chaklander et al. ......... 501/89 |
| 5,110,770 | 5/1992 | Brandt et al. ............... 501/89 |

OTHER PUBLICATIONS

Ramsdell, L. S., "Studies on Silicon Carbide", Amer. Miner., vol. 32, pp. 64–82, 1947.
Zangvil, A., et al, "Phase Relationships in the Silicon Carbide–Aluminum Nitride System", J. Am. Ceram. Soc., vol. 71, pp. 884–890, 1980.
W. Boecker et al, "Single Phase Alpha-Silicon Carbide Reinforcements for Composites", Ceramic Transactions 2 (Silicon Carbide 1987) 1989, pp. 407–420.
Kravets, V. A., "Phase Composition and Distinctive Features of the Formation of Silicon Carbide Single Crystals", Izvestiya Akademii Nauk, SSSR, Neorganicheskie Materialy, vol. 20, pp. 694–696, Apr. 1984.
Homeny, J., et al, "Processing and Mechanical Properties of SiC-Whisker-$Al_2O_3$-Matrix Composites", Ceramic Bulletin, vol. 66, No. 2, pp. 333–338, 1987.

Primary Examiner—Karl Group
Attorney, Agent, or Firm—Burns, Doane, Swecker & Mathis

[57] ABSTRACT

The properties of silicon carbide whisker reinforced aluminum oxide, at present used for cutting tools when machining nickel based alloys, are in a very complex way related to processing and microstructure. Important parameters that have been recognized include whisker/platelet distribution, diameter, aspect ratio, surface chemistry and surface morphology. One parameter that has not been discussed is the crystal structure of the silicon carbide phase. Silicon carbide exist in a number of different polytypes, the most common with cubic or hexagonal structure. Available commercial silicon carbide contains mixed hexagonal and cubic silicon carbide-phases or single phase cubic. During sintering it is possible to transform cubic to hexagonal phase by special processing. It is shown that the hexagonal to cubic ratio strongly affects the performance in metal cutting operations and especially toughness behavior is related to a high hexagonal to cubic ratio.

9 Claims, 1 Drawing Sheet

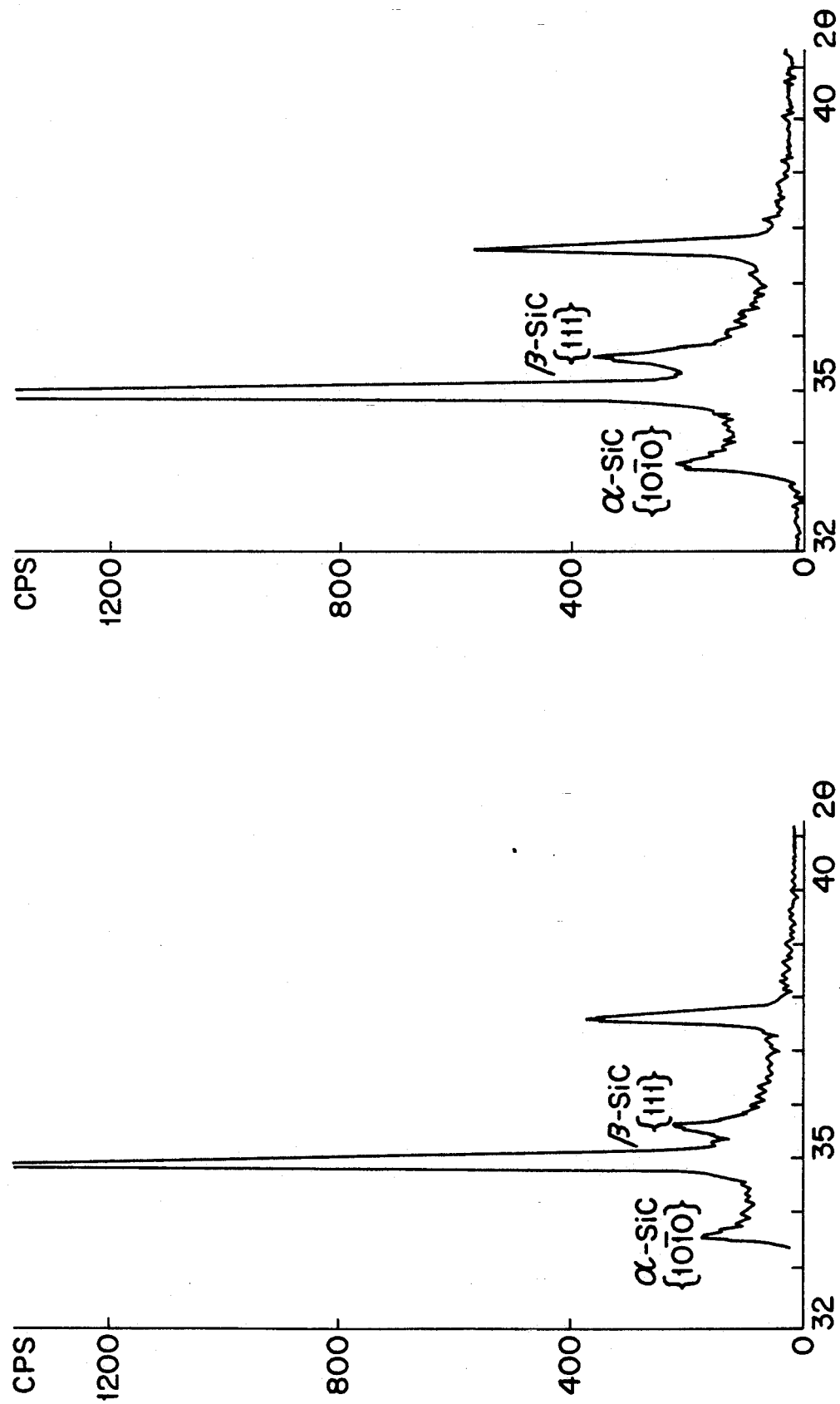

WHISKER REINFORCED COMPOSITES FOR CUTTING TOOLS WITH IMPROVED PERFORMANCE

BACKGROUND OF THE INVENTION

The present invention relates in general to ceramic cutting tool materials and, in particular, to such materials in which monocrystalline silicon carbide whiskers or platelets are homogeneously distributed in an oxide based matrix and, more particularly, to such composites where the crystal structure of the silicon carbide whiskers is modified during sintering from a low to a high hexagonal to cubic ratio.

Ceramic cutting tools have been available for several decades. It is not until the last decade that they have achieved a more substantial importance for use in chip forming machining. The main reason for the limited acceptance of ceramic cutting tools has been sudden and unexpected tool insert failures because of inadequate strength, toughness and thermal shock resistance.

During the last ten years, the properties of ceramic cutting materials have been improved in many respects which is why they have especially increased their relative share in the cutting of cast iron and heat resistant alloys.

Aluminum oxide based cutting tools are very sensitive to thermal cracking as aluminum oxide itself has a relatively low thermal conductivity. This fact leads to very short tool lives under conditions leading to thermal shock, i.e., high cutting edge temperatures, short engagement times and varying cutting depths.

To a certain extent, the thermal properties of aluminum oxide have been improved by the addition of titanium carbide and/or titanium nitride which improves the thermal conductivity of the composite material. Their addition also increases the hardness of the composite. In comparison with pure aluminum oxide materials, an increased tool life is therefore obtained in cutting of hard workpiece materials and in operations demanding high resistance to thermal shocks. This type of material has, however, too poor a toughness behavior for a more general use and is therefore mainly used at relatively low feeds.

Another, later step of development includes the addition of homogeneously dispersed fine-grained zirconium oxide particles in a matrix of aluminum oxide. This type of material is described in the U.S. Pat. No. 4,218,253. Transformation of the "metastable" zirconium oxide particles during use increases both strength and toughness and thus will lead to a more predictable tool life. The thermal properties of said material are, however, insignificantly better than those of pure aluminum oxide materials which is why initiation and growth of thermally induced cracks still create problems in practical cutting operations generating high cutting edge temperatures.

It has more recently been shown that addition of silicon carbide whiskers, monocrystalline hair crystals, to an aluminum oxide matrix leads to a greatly improved fracture toughness and strength. This type of material is described in U.S. Pat. No. 4,543,345. Ceramic materials based upon this concept have proved a very good performance in cutting of heat resistant alloys, especially Inconel 718.

Zirconium oxide and silicon carbide whiskers can also be combined as described in the U.S. Pat. No. 4,657,877.

Both the mentioned additions have led to substantial improvements of the toughness behavior in certain metal cutting operations. However, the search for greater improvements of the properties of cutting tools is continuously ongoing.

The properties of silicon carbide whisker reinforced ceramic composites are to a great extent dependent on their processing, since the chemistry of the whisker surface will determine the strength of the bond between the whisker and the matrix. A strong chemical bond is to be avoided since the desired bridging and deflecting properties of the whiskers then is lost. This is further described in the U.S. Pat. No. 4,916,092.

Silicon carbide exists in a number of different polytypes (Ramsdell LS, Amer. Miner. 32, p. 64–82, 1947). These different polytypes have different stability areas (Zangvil and Ruh, J. Am. Cer. Soc. 71, 10, p. 884–90, 1980). Possible mechanisms for transformation from cubic to hexagonal silicon carbide includes deformation and diffusion (Kravets VA, Izvestiya Akademii Nauk SSSR, Neorganicheskie Materialy, 20, n 4, pp. 694–696, 1984). It is known that it is possible to change the crystal structure of silicon carbide single crystals per se from cubic to hexagonal by heating. The transformation may also be influenced by the chemical composition of the whisker.

Commercially available silicon carbide whiskers have a cubic or a mixed cubic to hexagonal crystal structure having a low amount of the hexagonal crystal structure, generally about 20% hexagonal, remainder cubic crystal structure. During sintering of a silicon carbide whisker reinforced aluminum oxide, it has now been found possible to alter the original crystal structure of the whisker even while embedded in the aluminum oxide matrix and to partially transform the cubic crystal structure to a hexagonal crystal structure. The transformation is favored by a high sintering temperature.

OBJECTS OF THE INVENTION

It is an object of this invention to avoid or alleviate the problems of the prior art.

It is also an object of this invention to provide an improved silicon carbide whisker or platelet reinforced ceramic oxide cutting insert and a method for its use.

SUMMARY OF THE INVENTION

In one aspect of the invention there is provided an oxide based ceramic cutting insert for chip forming machining comprising a ceramic oxide based matrix and 5–50% by volume of homogeneously dispersed whiskers and/or platelets of silicon carbide, the intensity of the $\{10\bar{1}0\}$-peak from the hexagonal modification of the silicon carbide is $>0.7$ of the intensity from the $\{111\}$-peak from the cubic modification of the silicon carbide in X-ray diffraction pattern in the rake face using CuK$\alpha$-radiation.

In another aspect of the present invention, there is provided a method of cutting metal with an oxide based ceramic cutting insert for chip forming machining, the improvement comprising using the cutting insert as described above.

BRIEF DESCRIPTION OF THE DRAWINGS

FIG. 1 shows an X-ray diffraction pattern using CuKα-radiation from a material according to the invention; and FIG. 2 shows and X-ray diffraction pattern using CuKα-radiation from a prior art material. α-SiC refers to hexagonal silicon carbide and β to cubic in both FIGS.

DETAILED DESCRIPTION OF THE PREFERRED EMBODIMENTS OF THE INVENTION

It has now surprisingly been found also that the crystal structure of the silicon carbide whiskers affects the properties especially in metal cutting operations. The ceramic cutting material according to the present invention comprises an oxide based, preferably aluminum oxide based, matrix with 5-50%, preferably 10-40%, especially 20-30%, by volume homogeneously dispersed whiskers and/or platelets of silicon carbide with a high hexagonal to cubic ratio (measured as the ratio between the peak heights in an X-ray diffraction pattern from the rake face of the cutting insert of the $\{10\bar{1}0\}$-peak for hexagonal silicon carbide and the $\{111\}$-peak for cubic, said ratio being >0.70, preferably >0.75, most preferably >0.775. The volume % of silicon carbide shall be <50, preferably <25.

Said whiskers consist of monocrystals with a diameter of 0.2-10 μm and a length of 2.5-100 μm with a length to diameter ratio preferably of 5-30. Said platelets consist of monocrystals with a diameter of <20 μm and a thickness <5 μm.

The grain size of the oxide matrix shall be less than 10 μm, preferably less than 4 μm. The oxide matrix consists essentially of ceramic oxides or of ceramic oxides mixed with hard carbides and/or nitrides and/or borides. Preferably, the ceramic matrix shall contain <20% by volume zirconium oxide.

The cutting material according to the invention is made by wet milling and mixing of oxide based powder and whisker and/or platelets. After drying, the mixture is pressed to desired geometrical form and sintered to near theoretical density, and after the sintering the possible remaining porosity can be further reduced using hot isostatic pressing. If it is not possible to obtain a closed porosity by pressureless sintering, the material can be pressure sintered with a suitable graphite tool or after encapsulation be hot isostatically pressed to desired density. The sintering conditions depend upon the whisker/platelet raw material and is chosen so that the material reaches a density which exceeds 98%, preferably >99.5% of theoretical density, a maximum pore size of 10 μm and a hexagonal to cubic ratio as defined above. This ratio increases with sintering temperature and possibly holding time. While various ranges of sintering temperatures and times have been suggested in the prior art, it has been found that only relatively high temperatures of about 1820° C. or higher, generally for a relatively long time of about 90 minutes or more, can be used to cause the desired modification in the crystal structure of the silicon carbide whiskers in the alumina matrix. It is within the purview of the skilled artisan to determine, for example by x-ray analysis of the sintered product, whether the requisite amount of transformation has occurred and to modify the sintering conditions in accordance with the present specification, if desired, to effect the amount of transformation.

The invention is additionally illustrated in connection with the following Examples which are to be considered as illustrative of the present invention. It should be understood, however, that the invention is not limited to the specific details of the Examples.

EXAMPLE 1

100 g of silicon carbide whiskers with a hexagonal to cubic ratio of 0.20 (SC9 silicon carbide whiskers commercially available from Advanced Composite Materials Corporation) were mixed with 300 g aluminum oxide (Alcoa A16 SG) and 30 g magnesium oxide and 30 g yttrium oxide. After drying, the mixture was hot pressed with varying sintering conditions.

The sintered materials were characterized with respect to hardness, density, fracture toughness and X-ray diffraction from the rake face to reveal the hexagonal to cubic ratio.

|   | Sintering | | Relative density % | Hardness, HV10 | Fracture toughness | Hexagonal/ Cubic ratio | |
| --- | --- | --- | --- | --- | --- | --- | --- |
| A | 1800° C. | 40 min | 99.2 | 1978 | 5.26 | 0.086 | |
| B | 1800° C. | 120 min | 99.0 | 2019 | 5.08 | 0.091 | Prior |
| C | 1810° C. | 45 min | 99.4 | 2022 | 5.34 | 0.613 | Art |
| D | 1825° C. | 100 min | 99.6 | 2014 | 5.25 | 0.773 | Invention |
| E | 1875° C. | 130 min | 99.9 | 2043 | 5.27 | 0.808 | tion |

EXAMPLE 2

The sintered materials from Example 1 were cut into blanks and ground to cutting tools inserts SNGN 120416 with a reinforcement land of 25° and width 0.2 mm. Cutting tool tests were performed with respect to toughness and wear resistance.

Toughness test was performed in steel SS 2242. Longitudinal turning with gradually increasing feed and interrupted cuts. 25 edges per variant were tested under the following conditions:

| Cutting Speed: | 100 m/min |
| --- | --- |
| Feed: | 0.17 mm/rev (start value) |
| Depth of cut (DOC): | 1.5 mm |

Percentage victories compared to material C and statistical difference expressed as t-values (Student's t-test) were

|   | % victories relative C | t-value | |
| --- | --- | --- | --- |
| A | 3 | −3.8 | |
| B | 10 | −3.1 | Prior Art |
| C | — | — | |
| D | 83 | 2.8 | Invention |
| E | 97 | 7.1 | |

From the statistical analysis it is obvious that A and B have significantly lower toughness behavior than C (>99.999% and >99.995% probability) and that D and E have a statistically better toughness behavior than C (>99.995% and >99.999% probability).

Wear resistance tests were performed in Iconel 718 (aged) with the following conditions:

| Cutting Speed: | 200 m/min |
|---|---|
| Feed: | 0.10 mm/rev |
| Depth of cut: | 2.0 mm |

Tool life criteria was notch wear at the depth of cut point. Tool lives at DOC-notch wear>2.5 mm are given

| | Tool life, min | |
|---|---|---|
| A | 4 | |
| B | 4.5 | Prior Art |
| C | 4 | |
| D | 6 | According to |
| E | 6 | the invention |

The notch wear resistance seems also to be improved by a high hexagonal to cubic ratio.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An oxide based ceramic cutting insert for chip forming machining comprising a ceramic oxide based matrix and 5-50% by volume of homogeneously dispersed whiskers and/or platelets of silicon carbide, the intensity of the $\{10\bar{1}0\}$-peak from the hexagonal modification of the silicon carbide is >0.7 of the intensity from the $\{111\}$-peak from the cubic modification of the silicon carbide in X-ray diffraction pattern from the rake face using CuK$\alpha$-radiation.

2. The cutting insert of claim 1 wherein said insert has a pore volume of <2% and a maximum pore diameter of 10 $\mu$m.

3. The cutting insert of claim 1 wherein said insert comprises 10-40% by volume of said whiskers or platelets of silicon carbide.

4. The cutting insert of claim 3 wherein said insert comprises 20-30% by volume of said whiskers or platelets of silicon carbide.

5. The cutting insert of claim 1 wherein the intensity of the said $\{10\bar{1}0\}$-peak is >0.75 of the intensity of the said $\{111\}$-peak.

6. The cutting insert of claim 5 wherein the intensity of the said $\{10\bar{1}0\}$-peak is >0.775 of the intensity of the said $\{111\}$-peak.

7. The cutting insert of claim 1 wherein said ceramic oxide comprises aluminum oxide.

8. The cutting insert of claim 7 wherein said matrix also comprises <20% zirconium oxide.

9. A method of cutting metal, comprising cutting metal with an oxide based ceramic cutting insert for chip forming machining, the cutting insert comprising the cutting insert of claim 1.

* * * * *